United States Patent [19]
Fischer

[11] Patent Number: 6,039,340
[45] Date of Patent: *Mar. 21, 2000

[54] GAS BAG COVER

[75] Inventor: Anton Fischer, Heuchlingen, Germany

[73] Assignee: TRW Occupant Restraint Systems GmbH, Alfdorf, Germany

[*] Notice: This patent issued on a continued prosecution application filed under 37 CFR 1.53(d), and is subject to the twenty year patent term provisions of 35 U.S.C. 154(a)(2).

[21] Appl. No.: 08/926,961

[22] Filed: Sep. 10, 1997

[30] Foreign Application Priority Data

Sep. 26, 1996 [DE] Germany ............... 296 16 823 U

[51] Int. Cl.⁷ ...................................................... B60R 21/16
[52] U.S. Cl. ............................... 280/728.2; 280/728.3
[58] Field of Search ........................... 280/728.2, 728.3, 280/731, 732

[56] References Cited

U.S. PATENT DOCUMENTS

| | | | |
|---|---|---|---|
| 3,687,496 | 8/1972 | Hindin | 29/455 |
| 4,424,968 | 1/1984 | Smith | 428/461 |
| 5,118,132 | 6/1992 | Nakajima | 280/728.3 |
| 5,121,942 | 6/1992 | Warnick et al. | 280/728.3 |
| 5,217,254 | 6/1993 | Satoh | 280/728.2 |
| 5,320,380 | 6/1994 | Hamada et al. | |
| 5,335,939 | 8/1994 | Kuriyama et al. | 280/728.3 |
| 5,427,407 | 6/1995 | Yokote | 280/728.2 |
| 5,427,408 | 6/1995 | Ando et al. | |
| 5,499,842 | 3/1996 | Yamamoto et al. | |

FOREIGN PATENT DOCUMENTS

0523882A1  1/1993  European Pat. Off. .

*Primary Examiner*—Paul N. Dickson
*Attorney, Agent, or Firm*—Tarolli, Sundheim, Covell, Tummino & Szabo L.L.P.

[57] ABSTRACT

A gas bag cover of pliant material which is attachable to a vehicle by a fastener, includes at least one molded, protruding fastener web having at least one recess in which the fastener engages, and a reinforcement part encasing the recess at least in part.

4 Claims, 1 Drawing Sheet

GAS BAG COVER

TECHNICAL FIELD

The invention relates to a gas bag cover.

BACKGROUND OF THE INVENTION

Gas bag covers usual hitherto consist of a single or two-component injection-molded plastics part featuring integrally molded fastener webs on its inner side. The cover is secured to the steering wheel hub or dashboard by means of studs or bolts engaging recesses in the fastener webs. Due to vibrations in the vehicle during its operation the recesses in the pliant plastic material may, however, become permanently widened. To prevent this, numerous recesses and fastener means have been provided to reduce the forces acting on the individual recess.

BRIEF DESCRIPTION OF THE INVENTION

The invention provides a gas bag cover in which widening of the recess can be practically excluded. In addition to this the forces receivable by a single recess are substantially higher than in the case of existing gas bag covers. The cover according to the invention is of pliant material and is attachable to a vehicle by a fastener means. The cover includes at least one molded, protruding fastener web having at least one recess in which the fastener means engages, and a reinforcement part encasing the recess at least in part. As a result of the invention, fewer fastener means need to be provided so that the time needed to fit the cover is reduced.

The gas bag cover according to the invention is of molded, foamed or cast synthetic material.

Preferably, the reinforcement part is embedded in the fastener web to define an interlocking connection and configured as a molding which completely encases the recess.

When a through-hole is provided in the fastener web the reinforcement part is preferably a hollow rivet which completely lines the recess on the inside. If, however, several through-holes are provided it may be simpler to configure the reinforcement as a double-layer plate, the layers of which are spaced and connected to each other by sleeves, each sleeve lining the corresponding recess on the inside. The force exterted by the fastener means on the fastener web is thus introduced therein over a large surface area.

DETAILED DESCRIPTION OF PREFERRED EMBODIMENTS

Figure 1:
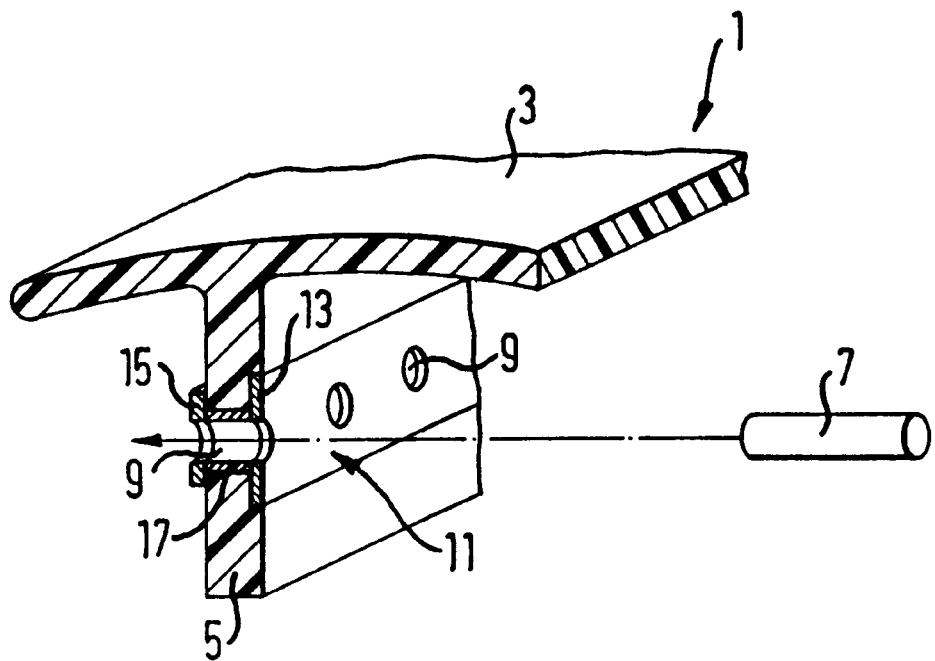
FIG. 1 shows a partial section through the gas bag cover according to a first embodiment of the invention.

In FIG. 1 a gas bag cover 1 is shown which closes off an opening in a dashboard in which a gas bag module is incorporated. The cover 1 is an injection-molded plastic part and features an outside wall 3 corresponding in color and surface texture to that of the dashboard. Protruding from the inner side of the wall 3, integrally molded thereto, is a fastener web 5. This serves to arrest the cover 1 to the vehicle. For this purpose fastener means 7 in the form of studs or bolts need to be inserted and axially locked or screwed into through-holes 9 provided in the fastener web 5 and into openings (not shown) in a vehicle-integral part. A reinforcement part 11 in the form of a molding serves to reinforce the through-holes 9 against tearing the edge of the holes or widening them due to vibrations when the vehicle is in operation.

The reinforcement part 11 is configured in accordance with FIG. 1 as a double-layer plate of metal, the layers 13, 15 of which are spaced away from each other and connected to each other by intermediate parts in the form of sleeves 17. The reinforcement part 11 is embedded in a form-fitting manner in the fastener web 5 so that the sleeves 17 are surrounded on the outside by plastic material and the layers 13, 15 are arranged on the outside on the fastener web 5. Introducing tensile forces into the cover 1 occurs over a large surface area via the reinforcement part 11 so that fewer through-holes 9 and fastener means 7 can be provided than in the case of a cover having no reinforcement part 11. Since the reinforcement part 11 completely lines the through-holes 9 on the inside, the through-holes 9 are also not widened by vibration which may lead to a loosening of the cover 1.

Figure 2:
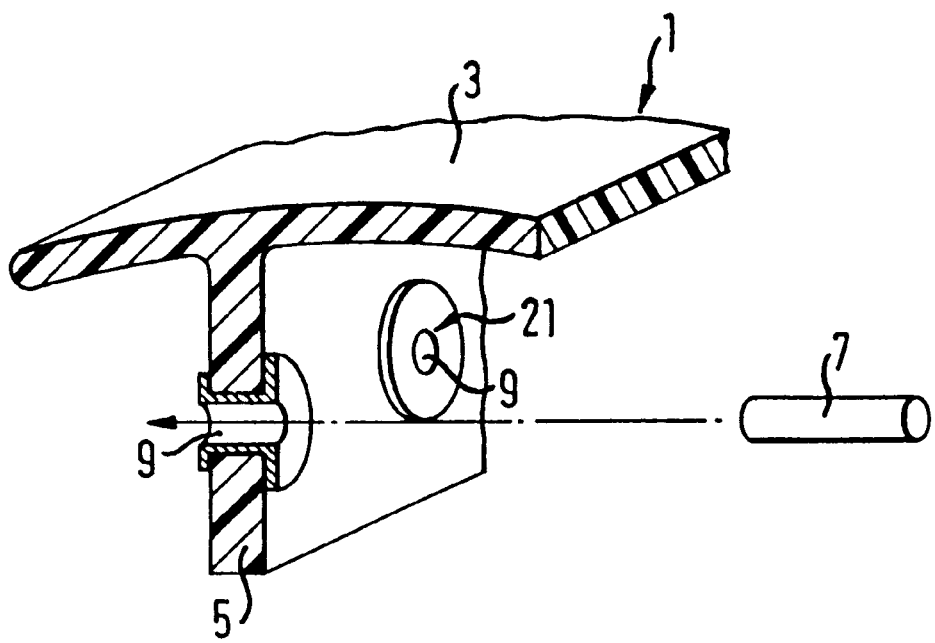
FIG. 2 shows a partial section through the gas bag cover according to a second embodiment of the invention.

The embodiment of the cover 1 depicted in FIG. 2 differs from that shown in FIG. 1 in that each through-hole 9 features its own reinforcement part 21 in the form of a hollow rivet which can be arrested following injection-molding of the cover 1 on the fastener web 5 or is embedded in the fastener web 5 on injection-molding of the cover 1.

What is claimed is:

1. Apparatus attachable to a vehicle, said apparatus comprising:

a gas bag cover of pliant material having an outside wall and at least one molded fastener web protruding from said outside wall, said fastener web having outer opposite surfaces and through-holes spaced from each other extending through said fastener web;

a reinforcement part embedded in said fastener web, said reinforcement part having a double-layer plate with first and second layers spaced from each other and arranged on said outer opposite surfaces of said fastener web, said reinforcement part covering only a part of each of said outer opposite surfaces, said first and second layers being connected by integrally molded sleeves having through-bores, each of said sleeves completely lining an inside of one of said through-holes; and fastener means for attaching said gas bag cover and said reinforcement part to the vehicle, said fastener means being extendable through said through-bores in said sleeves.

2. Apparatus as defined in claim 1 wherein said cover is of injection-molded synthetic material.

3. Apparatus as defined in claim 1 wherein said cover is of foamed synthetic material.

4. Apparatus as defined in claim 1 wherein said cover is of cast synthetic material.

* * * * *